(12) United States Patent
Moutray

(10) Patent No.: US 11,371,653 B2
(45) Date of Patent: *Jun. 28, 2022

(54) THREADED BOSS FOR PRESSURE VESSEL

(71) Applicant: Hexagon Technology AS, Alesund (NO)

(72) Inventor: Brad James Moutray, Sioux Falls, SD (US)

(73) Assignee: Hexagon Technology AS, Alesund (NO)

(*) Notice: Subject to any disclaimer, the term of this patent is extended or adjusted under 35 U.S.C. 154(b) by 160 days.

This patent is subject to a terminal disclaimer.

(21) Appl. No.: 16/923,488

(22) Filed: Jul. 8, 2020

(65) Prior Publication Data

US 2020/0332957 A1 Oct. 22, 2020

Related U.S. Application Data

(63) Continuation of application No. 15/969,002, filed on May 2, 2018, now Pat. No. 10,746,354.

(Continued)

(51) Int. Cl.
*F17C 1/00* (2006.01)
*F17C 1/06* (2006.01)

(52) U.S. Cl.
CPC ............... *F17C 1/00* (2013.01); *F17C 1/06* (2013.01); *F17C 2201/0109* (2013.01);
(Continued)

(58) Field of Classification Search
CPC ...... F17C 1/00; F17C 1/06; F17C 2201/0109; F17C 2201/054; F17C 2201/056;
(Continued)

(56) References Cited

U.S. PATENT DOCUMENTS 5,476,189 A 12/1995 Duvall et al.
5,819,978 A * 10/1998 Hlebovy .................. F17C 1/16
220/601

(Continued)

FOREIGN PATENT DOCUMENTS

CN 100436931 C 11/2008
CN 102282409 B 3/2016

(Continued)

OTHER PUBLICATIONS

Office Action for Korean Patent Application No. 10-2019-7033868, dated May 1, 2021, 18 pages.

(Continued)

*Primary Examiner* — Don M Anderson
(74) *Attorney, Agent, or Firm* — Mai-Tram D. Lauer; Westman, Champlin & Koehler, P.A.

(57) ABSTRACT

A boss includes a neck and a flange that extends radially outward from the neck. The neck includes a bore therethrough with a longitudinal axis. The flange includes an exterior surface, an interior surface, and a peripheral surface at a farthest extent from the longitudinal axis. The peripheral surface connects the interior surface and the exterior surface and includes, along any radius of the boss, a first circumferential ridge and a second circumferential ridge, wherein the first circumferential ridge is located closer to the exterior surface than the second circumferential ridge. In another aspect, a pressure vessel includes a boss and a liner. In yet another aspect, a method of assembling a pressure vessel is described, which includes inserting the boss through the aperture of the liner and connecting the boss and liner so that the peripheral surface of the boss mates with the perimeter surface of the liner.

11 Claims, 5 Drawing Sheets

Related U.S. Application Data

(60) Provisional application No. 62/510,328, filed on May 24, 2017.

(52) U.S. Cl.
CPC .. *F17C 2201/054* (2013.01); *F17C 2201/056* (2013.01); *F17C 2203/0604* (2013.01); *F17C 2203/066* (2013.01); *F17C 2203/0619* (2013.01); *F17C 2203/0639* (2013.01); *F17C 2203/0646* (2013.01); *F17C 2203/0648* (2013.01); *F17C 2203/0663* (2013.01); *F17C 2205/0305* (2013.01); *F17C 2209/224* (2013.01); *F17C 2221/011* (2013.01); *F17C 2221/012* (2013.01); *F17C 2221/014* (2013.01); *F17C 2221/033* (2013.01); *F17C 2221/035* (2013.01); *F17C 2223/0123* (2013.01)

(58) Field of Classification Search
CPC ...... F17C 2203/0604; F17C 2203/0619; F17C 2203/0639; F17C 2203/0646; F17C 2203/0648; F17C 2203/066; F17C 2203/0663; F17C 2205/0305; F17C 2209/224; F17C 2221/011; F17C 2221/012; F17C 2221/014; F17C 2221/033; F17C 2221/035; F17C 2223/0123; F17C 13/00; F17C 1/16; F17C 1/02; F17C 2205/0302; Y02E 60/32
See application file for complete search history.

(56) References Cited

U.S. PATENT DOCUMENTS

| | | | |
|---|---|---|---|
| 5,976,692 A * | 11/1999 | Brezler, III | A46D 1/00 428/372 |
| 8,668,108 B2 | 3/2014 | Yeggy et al. | |
| 9,103,500 B2 | 8/2015 | Newhouse et al. | |
| 9,644,790 B2 | 5/2017 | Newhouse et al. | |
| 10,088,104 B2 | 10/2018 | Leavitt et al. | |
| 10,180,210 B2 | 1/2019 | Newhouse et al. | |
| 10,746,354 B2 * | 8/2020 | Moutray | F17C 1/06 |
| 2007/0012551 A1 | 1/2007 | Rohwer et al. | |
| 2011/0210515 A1 | 9/2011 | Sharp et al. | |
| 2011/0303681 A1 | 12/2011 | Newhouse et al. | |
| 2014/0144866 A1 * | 5/2014 | Heo | F17C 13/002 215/45 |
| 2015/0345702 A1 | 12/2015 | Newhouse et al. | |
| 2016/0025266 A1 * | 1/2016 | Leavitt | F17C 1/06 206/0.6 |
| 2017/0205029 A1 | 7/2017 | Newhouse et al. | |
| 2017/0284601 A1 * | 10/2017 | Kusaba | F17C 1/04 |

FOREIGN PATENT DOCUMENTS

| | | |
|---|---|---|
| DE | 10 2006 057 422 B3 | 6/2008 |
| EP | 0 656 506 B1 | 8/1999 |
| EP | 2 778 449 A1 | 9/2014 |
| EP | 2 778 499 A1 | 9/2014 |
| EP | 2 399 061 B1 | 9/2019 |
| JP | 2008-164134 A | 7/2008 |
| JP | 2012-514727 A | 6/2012 |
| KR | 10-1434046 B1 | 8/2014 |
| KR | 10-1498277 B1 | 3/2015 |
| RU | 2 426 024 C2 | 2/2011 |

OTHER PUBLICATIONS

Notice of Reason(s) for Rejection for Japanese Patent Application No. 2019-564907, dated Mar. 30, 2021, 12 pages.
Exam Report for Canadian Patent Application No. 3,059,958, dated Mar. 31, 2021, 5 pages.
First Office Action, including search, for Chinese Patent Application No. 201880030574X, dated Nov. 17, 2020, 20 pages.
Office Action, including search report, for Russian Patent Application No. 2019142452/12, dated Apr. 9, 2021, 14 pages.
Second Office Action, including search report, for Chinese Patent Application No. 201880030574.X, dated Jun. 7, 2021, 12 pages.
Notice of Reason(s) for Rejection for Japanese Patent Application No. 2019-564907, dated Aug. 17, 2021, 5 pages.

* cited by examiner

THREADED BOSS FOR PRESSURE VESSEL

CROSS REFERENCE TO RELATED APPLICATION

This application is a continuation of U.S. patent application Ser. No. 15/969,002, filed May 2, 2018, which issued as U.S. Pat. No. 10,746,354 on Aug. 18, 2020, and which claims the benefit of priority from U.S. Provisional Patent Application No. 62/510,328, filed May 24, 2017; these priority applications are hereby fully incorporated by reference.

BACKGROUND

Pressure vessels are commonly used for containing a variety of fluids under pressure, such as hydrogen, oxygen, natural gas, nitrogen, propane, methane and other fuels, for example. Generally, pressure vessels can be of any size or configuration. The vessels can be heavy or light, single-use (e.g., disposable), reusable, subjected to high pressures (greater than 50 pounds per square inch (psi) (344,738 pascal), for example), low pressures (less than 50 psi or 344,738 pascal, for example), or used for storing fluids at elevated or cryogenic temperatures, for example.

Suitable pressure vessel shell materials include metals, such as steel; or composites, which may include laminated layers of wound fiberglass filaments or other synthetic filaments bonded together by a thermal-setting or thermoplastic resin. The fiber may be fiberglass, aramid, carbon, graphite, or any other generally known fibrous reinforcing material. The resin material used may be epoxy, polyester, vinyl ester, thermoplastic, or any other suitable resinous material capable of providing fiber-to-fiber bonding, fiber layer-to-layer bonding, and the fragmentation resistance required for the particular application in which the vessel is to be used. The composite construction of the vessels provides numerous advantages such as lightness in weight and resistance to corrosion, fatigue and catastrophic failure. These attributes are due to the high specific strengths of the reinforcing fibers or filaments.

A polymeric or other non-metallic resilient liner or bladder is often disposed within a composite shell to seal the vessel and prevent internal fluids from contacting the composite material. The liner can be manufactured by compression molding, blow molding, injection molding, or any other generally known technique. Alternatively, the liner can be made of other materials, including steel, aluminum, nickel, titanium, platinum, gold, silver, stainless steel, and any alloys thereof. Such materials can be generally characterized as having a high modulus of elasticity. In one embodiment, a liner is formed of blow molded high density polyethylene (HDPE).

FIG. 1 illustrates an elongated pressure vessel 10, such as that disclosed in U.S. Pat. No. 5,476,189, entitled "Pressure vessel with damage mitigating system," which is hereby incorporated by reference. Pressure vessel 10 has a main body section 12 and substantially hemispherical or dome-shaped end sections 14. A boss 16, typically constructed of aluminum, is provided at one or both ends of the pressure vessel 10 to provide a port for communication between the interior environment 17 of the pressure vessel 10 and the exterior environment 19. As shown in FIG. 2, pressure vessel 10 is formed with liner 20 (such as an inner polymer liner) covered by a shell 18. In an example, the shell 18 can be a filament-wound composite shell. The shell 18 resolves structural loads on the pressure vessel 10, while liner 20 provides a gas barrier.

FIG. 2 illustrates a partial cross-sectional view, taken along line 2-2 of FIG. 1, of an end section 14 including boss 16, such as that disclosed in U.S. Pat. No. 5,429,845, entitled "Boss for a filament wound pressure vessel," which is hereby incorporated by reference. Boss 16 includes neck 22 having exterior surface 23 and a port 26. The port 26 perpendicularly traverses the exterior surface 23 of the boss 16 and allows fluid communication between the exterior environment 19 and the interior environment 17 of pressure vessel 10. The boss 16 also includes a flange 24 (depicted as an annular flange) extending radially outward from port 26 of neck 22. As shown, FIG. 2 illustrates an interface 60 between the shell 18 and the liner 20. FIG. 2 also illustrates an interface 62 between the liner 20 and the boss 16. In this disclosure, surfaces, directions, and elements facing interior environment 17 are referred to with the descriptor "interior," and surfaces, directions, and elements facing exterior environment 19 are referred to with the descriptor "exterior." It is to be understood that this notation is not limiting; rather, it is provided for convenience and ease of comprehension, and other descriptors may also be used and/or suitable.

Generally, flange 24 of boss 16 is contained between portions of liner 20 and/or is sandwiched between the liner 20 and the shell 18. Typically, shell 18 abuts neck 22. In certain embodiments, flange 24 includes an exterior side 38 and an interior side 37. Flange 24 may include at least one groove 32 (depicted as an annular groove) that is shaped to accept a tab 34 (such as an annular tab) of liner 20. This construction secures the boss 16 to the pressure vessel 10 and provides a seal at interface 62 between the boss 16 and liner 20.

A method of forming a pressure vessel 10 includes mounting a boss on a mandrel and allowing a fluid polymer material for liner 20 to flow around flange 24 and into groove 32 of boss 16. The liner material then solidifies, thereby forming, in some embodiments, a portion 35 of liner 20 adjacent to exterior side 38 of flange 24, and tab 34 received within groove 32. Liner 20 is thereby mechanically interlocked with boss 16. Accordingly, even under extreme pressure conditions, separation of liner 20 from boss 16 is prevented.

Typically, shell 18 is formed from wound fibers and surrounds the liner 20 and at least a portion of flange 24 of boss 16. In one method, a dispensing head for the fibers moves in such a way as to wrap the fiber on the liner 20 in a desired pattern. If the pressure vessel 10 is cylindrical, rather than spherical, fiber winding is normally applied in both a substantially longitudinal (helical) and circumferential (hoop) wrap pattern. This winding process is defined by a number of factors, such as resin content, fiber configuration, winding tension, and the pattern of the wrap in relation to the axis of the liner 20. Details relevant to the formation of an exemplary pressure vessel are disclosed in U.S. Pat. No. 4,838,971, entitled "Filament Winding Process and Apparatus," which is incorporated herein by reference.

SUMMARY

In one aspect, a boss includes a neck and a flange that extends radially outward from the neck. The neck includes a bore therethrough, wherein the bore has a longitudinal axis. The flange includes an exterior surface, an interior surface, and a peripheral surface at a farthest extent from the longitudinal axis. The peripheral surface connects the interior surface and the exterior surface and includes, along any radius of the boss, a first circumferential ridge and a second circumferential ridge, wherein the first circumferential ridge is located closer to the exterior surface than the second circumferential ridge.

In another aspect, a pressure vessel includes a boss and a liner. The boss includes a neck and a flange that extends radially outward from the neck. The neck includes a bore therethrough, wherein the bore has a longitudinal axis. The flange includes an exterior surface, an interior surface, and a peripheral surface at a farthest extent from the longitudinal axis. The peripheral surface connects the interior surface and the exterior surface and includes, along any radius of the boss, a first circumferential ridge and a second circumferential ridge, wherein the first circumferential ridge is located closer to the exterior surface than the second circumferential ridge. The liner includes a perimeter surface that interfaces with the peripheral surface of the boss, wherein the perimeter surface has contours that mate with the first circumferential ridge and a second circumferential ridge.

In yet another aspect, a method of assembling a pressure vessel is described, wherein the pressure vessel includes a boss and a liner. The boss includes a neck and a flange that extends radially outward from the neck. The neck includes a bore therethrough, wherein the bore has a longitudinal axis. The flange includes an exterior surface, an interior surface, and a peripheral surface at a farthest extent from the longitudinal axis. The peripheral surface connects the interior surface and the exterior surface and includes, along any radius of the boss, a first circumferential ridge and a second circumferential ridge, wherein the first circumferential ridge is located closer to the exterior surface than the second circumferential ridge. The liner includes an aperture having a perimeter surface. The method includes inserting the boss through the aperture of the liner and connecting the boss and liner so that the peripheral surface of the boss mates with the perimeter surface of the liner.

This disclosure, in its various combinations, either in apparatus or method form, may also be characterized by the following listing of items:

1. A boss including:
   a neck including a bore therethrough, wherein the bore has a longitudinal axis; and
   a flange that extends radially outward from the neck, wherein the flange includes:
      an exterior surface;
      an interior surface; and
      a peripheral surface at a farthest extent from the longitudinal axis;
         wherein the peripheral surface connects the interior surface and the exterior surface; and
         wherein the peripheral surface includes, along any radius of the boss, a first circumferential ridge and a second circumferential ridge, wherein the first circumferential ridge is located closer to the exterior surface than the second circumferential ridge.

2. The boss of item 1, wherein the peripheral surface includes a helical screw thread.

3. The boss of any of items 1-2, wherein a first distance between the longitudinal axis and the first circumferential ridge is equal to a second distance between the longitudinal axis and the second circumferential ridge.

4. The boss of any of items 1-3, wherein a first distance between the longitudinal axis and the first circumferential ridge is less than a second distance between the longitudinal axis and the second circumferential ridge.

5. The boss of any of items 1-4, wherein the first circumferential ridge is smaller than the second circumferential ridge.

6. The boss of any of items 1-5, wherein at least one of the first and second circumferential ridges has a substantially triangular cross-sectional shape having first and second surfaces that meet at an apex.

7. The boss of item 6, wherein at least one of the first and second surfaces is substantially perpendicular to the longitudinal axis.

8. The boss of any of items 1-7, wherein at least one of the first and second circumferential ridges has a convex curve shape.

9. The boss of any of items 1-8, wherein the first and second circumferential ridges are spaced apart.

10. A pressure vessel including a boss and a liner, wherein:
    the boss includes:
       a neck including a bore therethrough, wherein the bore has a longitudinal axis; and
       a flange that extends radially outward from the neck, wherein the flange includes:
          an exterior surface;
          an interior surface; and
          a peripheral surface at a farthest extent from the longitudinal axis;
             wherein the peripheral surface connects the interior surface and the exterior surface; and
             wherein the peripheral surface includes, along any radius of the boss, a first circumferential ridge and a second circumferential ridge, wherein the first circumferential ridge is located closer to the exterior surface than the second circumferential ridge; and
    the liner includes a perimeter surface that interfaces with the peripheral surface of the boss, wherein the perimeter surface has contours that mate with the first circumferential ridge and a second circumferential ridge.

11. The pressure vessel of item 10, wherein:
    the boss includes an annular tab on an exterior surface of the flange; and
    the liner includes a groove configured to accept the tab.

12. The pressure vessel of item 11, wherein the tab and the groove are configured so that an interference fit is achieved at an interface of the tab and the groove.

13. The pressure vessel of any of items 11-12, further including a gasket disposed between the tab and the groove.

14. The pressure vessel of any of items 10-13, wherein the peripheral surface includes a helical screw.

15. A method of assembling a pressure vessel including a boss and a liner, wherein:
    the boss includes:
       a neck including a bore therethrough, wherein the bore has a longitudinal axis; and
       a flange that extends radially outward from the neck, wherein the flange includes:
          an exterior surface;
          an interior surface; and
          a peripheral surface at a farthest extent from the longitudinal axis;
             wherein the peripheral surface connects the interior surface and the exterior surface; and
             wherein the peripheral surface includes, along any radius of the boss, a first circumferential ridge and a second circumferential ridge, wherein the first circumferential ridge is located closer to the exterior surface than the second circumferential ridge; and the liner includes an aperture having a perimeter surface; the method including:

inserting the boss through the aperture of the liner; and connecting the boss and liner so that the peripheral surface of the boss mates with the perimeter surface of the liner.

16. The method of item 15, wherein connecting the boss and liner includes snap-fitting the peripheral surface of the boss with the perimeter surface of the liner.

17. The method of any of items 15-16, wherein connecting the boss and liner includes rotating the peripheral surface of the boss against the perimeter surface of the liner to remove material from the perimeter surface of the liner.

18. The method of item 17, further including advancing the boss along the longitudinal axis relative to the liner.

19. The method of any of items 15-18, further including achieving an interference fit at an interface between the peripheral surface of the boss and the perimeter surface of the liner.

20. The method of any of items 15-19, further including flexing the liner to allow passage of the boss through the aperture, wherein the aperture has a circumferential dimension smaller than a circumferential dimension of the peripheral surface.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. Moreover, analogous structures may have reference numerals that are indexed by one hundred.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope of the principles of this disclosure.

The figures may not be drawn to scale. In particular, some features may be enlarged relative to other features for clarity. Moreover, where terms such as interior, exterior, above, below, over, under, top, bottom, side, right, left, horizontal, vertical, etc., are used, it is to be understood that they are used only for ease of understanding the description. It is contemplated that structures may be oriented otherwise.

DETAILED DESCRIPTION

Figure 1:
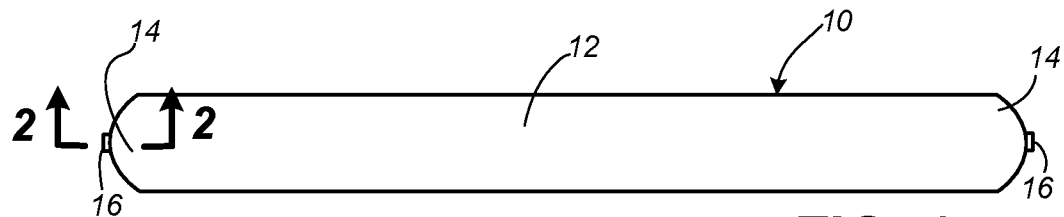
FIG. 1 is a side view of a typical conventional pressure vessel.
Figure 2:
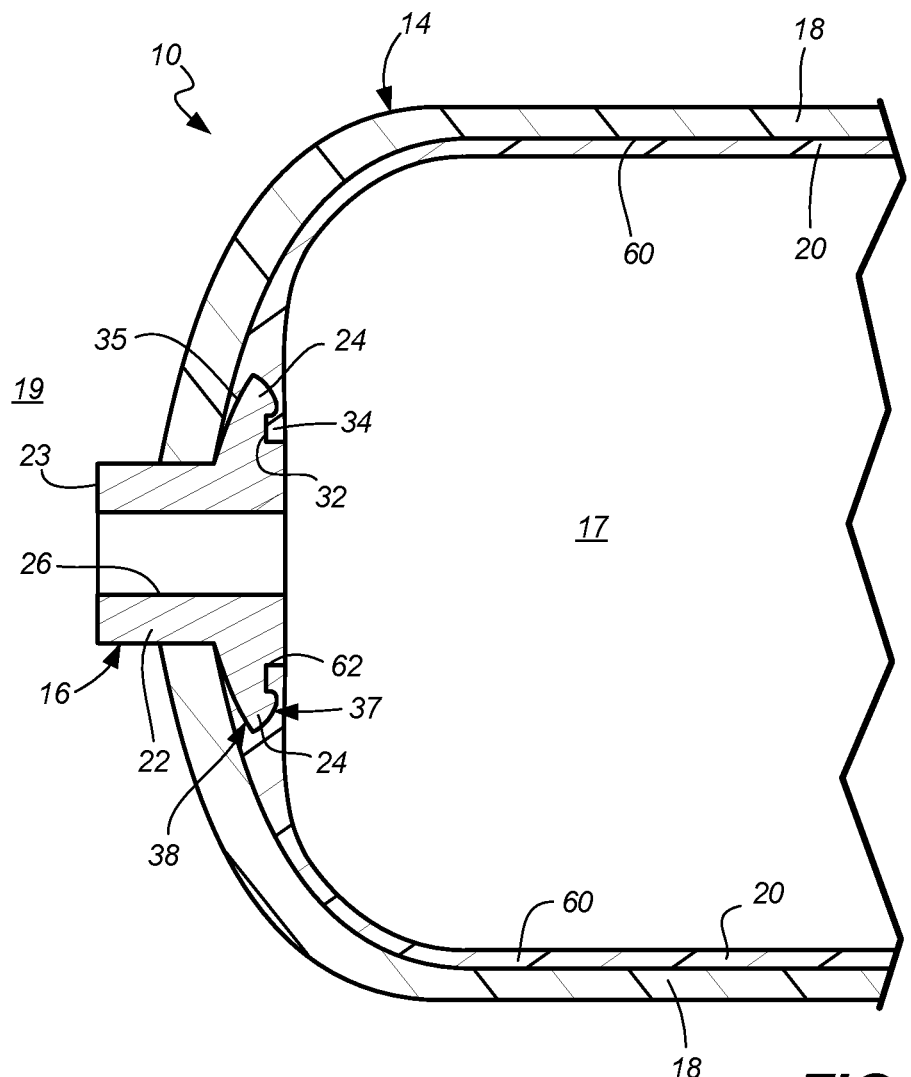
FIG. 2 is a partial cross-sectional view of one end of the pressure vessel of FIG. 1, taken along line 2-2 of FIG. 1 and showing a typical boss, liner and shell.

The orientations of the components of FIGS. 3-10E are different from those in FIG. 2, in that the exterior surface 123 of boss 116 is shown as a horizontal surface at the bottom of each of the respective drawing figures. Moreover, in the drawings of the boss 116 of the present disclosure, only half of the boss 116 is illustrated. It is to be understood that each boss 116 is a generally annular, symmetrical member, similar to boss 16 of FIG. 2. In exemplary embodiments, boss 116 is radially symmetrical about longitudinal axis 152.

Figure 3:
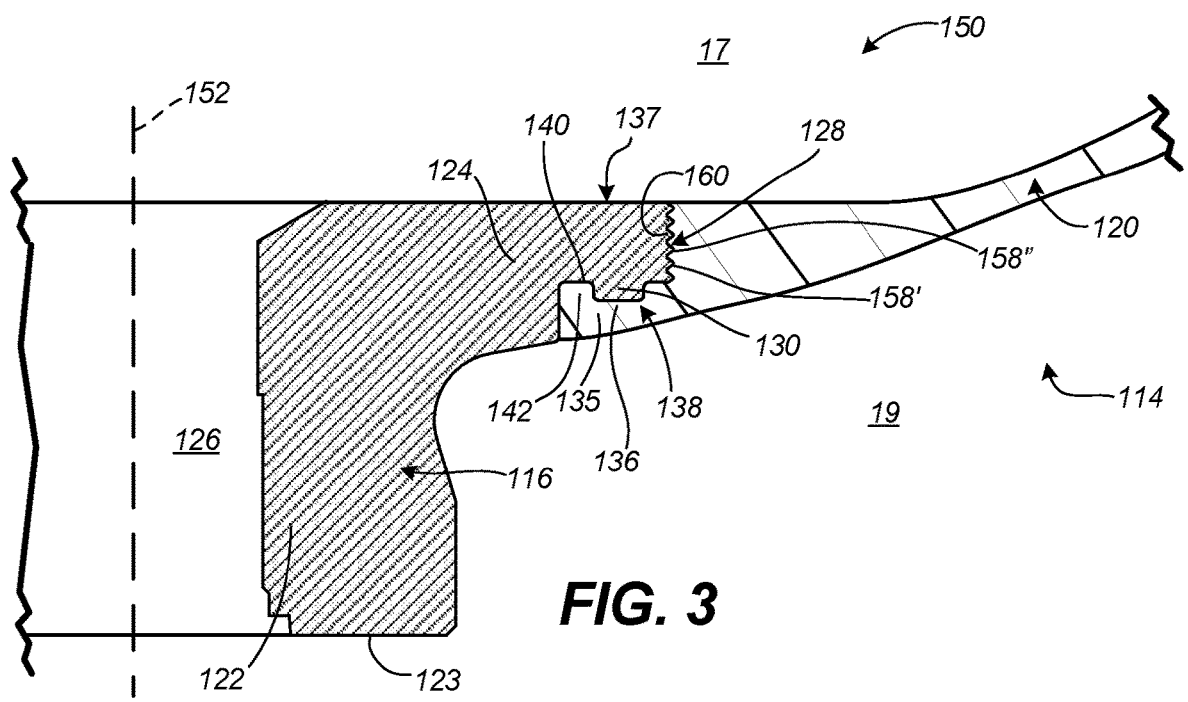
FIG. 3 is a partial cross sectional view of an end portion of an exemplary pressure vessel boss and liner assembly.

As shown in FIG. 3, the present disclosure describes a boss 116 for a pressure vessel. Boss 116 includes neck 122 having a port or bore 126 therethrough. Bore 126 has a longitudinal axis 152. Boss 116 has a flange 124 that extends radially outward from neck 122. Flange 124 includes an exterior side 138 facing toward exterior environment 19 and an interior side 137 facing interior environment 17. Peripheral surface 128 is located on flange 124 at a farthest extent from bore 126. Peripheral surface 128 connects exterior side 138 and interior side 137 of flange 124.

FIGS. 3-10E show radial cross-sectional views of boss 116 and/or liner 120. Viewing a cross-section along any radius of boss 116, peripheral surface 128 includes circumferential ridges 158. A first circumferential ridge 158' is located closer to the exterior side 138 of flange 124 than a second circumferential ridge 158".

Figure 4:
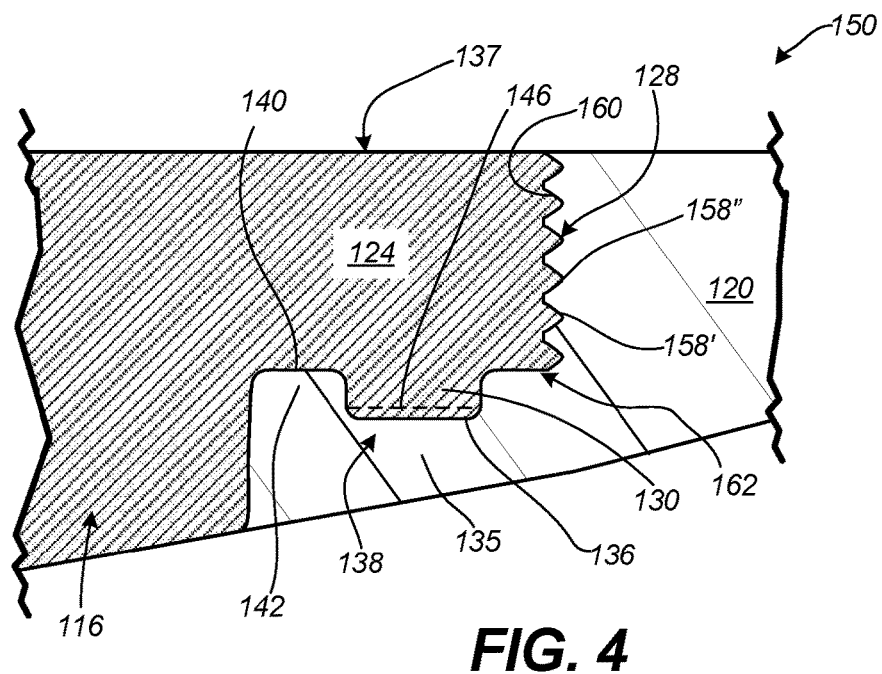
FIG. 4 is an enlarged view of a portion of FIG. 3.

In an exemplary embodiment shown in FIGS. 3 and 4, peripheral surface 128 includes a helical screw thread. Accordingly, in the cross-sectional view along any radius of boss 116, first circumferential ridge 158' and a second circumferential ridge 158" appear to be separate; in three dimensions, however, it is to be understood that in some embodiments, they are connected in a helical orientation about peripheral surface 128. In other embodiments, an adjacent circumferential ridges 158 are discrete structures that are separated by a valley therebetween.

Boss 116 may be inserted into a pre-fabricated dome-shaped end 114 of liner 120 and annealed to secure the attachment of the boss 116 and the liner 120 in assembly 150. Such pre-fabrication may be accomplished by known means including molding and machining, for example. An additional locking feature, such as a tab 130 in the boss 116 to be inserted into a groove 136 in the liner 120, may be also included on an exterior side 138 of the flange 124 to improve sealing and to prevent movement of the boss 116 relative to the liner 120 after formation of assembly 150. Moreover, an annular groove 140 in the boss 116 can be configured to accept an annular tab 142 of liner 120 to improve sealing and to prevent movement of the boss 116 relative to the liner 120. While no shell 18 is illustrated in FIGS. 3-10E, it is to be understood that in a typical pressure vessel, such a shell would be formed over the assembly 150 of boss 116 and liner 120.

Figure 5:
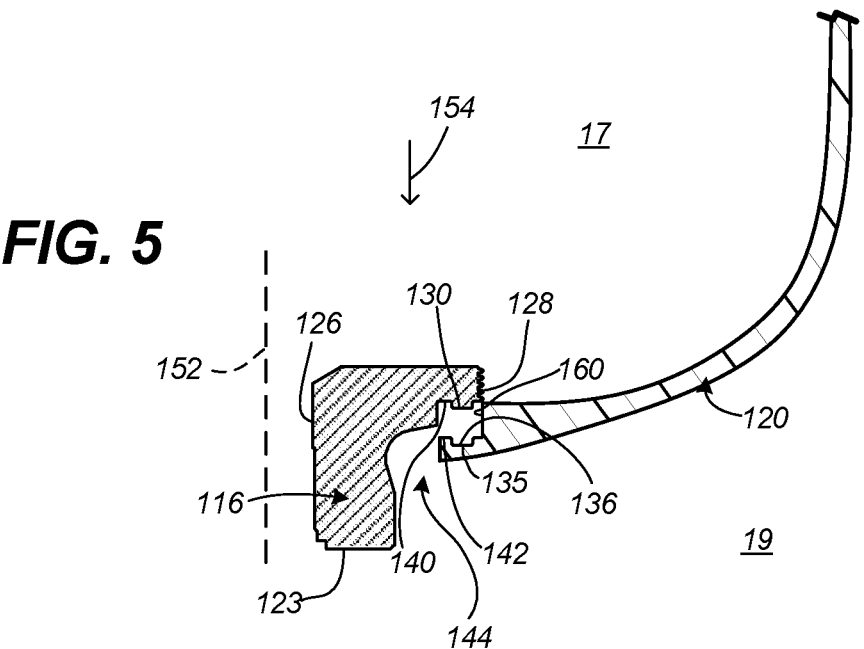
FIG. 5 is an exploded view of the exemplary boss and liner components of FIG. 3.
Figure 6:
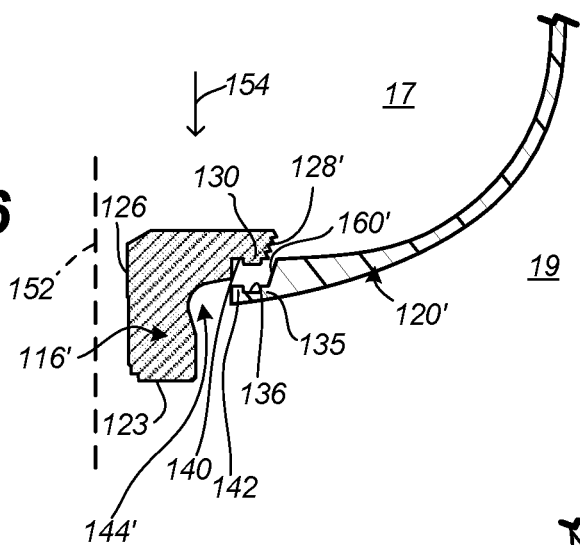
FIG. 6 is similar to FIG. 5 but shows second exemplary embodiments of a pressure vessel boss and liner.
Figure 7:
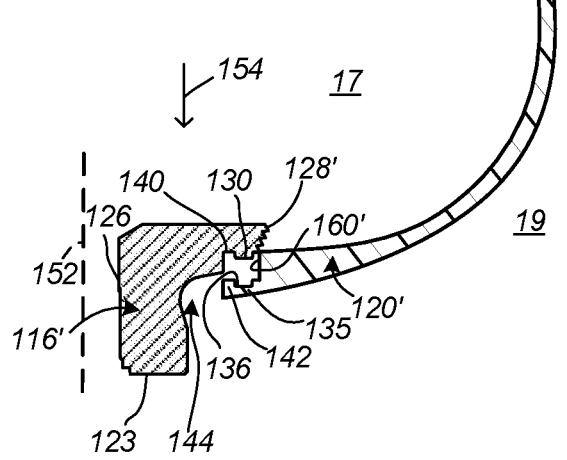
FIG. 7 is similar to FIGS. 5 and 6 but shows the boss of FIG. 6 being used with the liner of FIG. 5.

The described concepts lead to reduced stress concentrations in the boss 116, thereby increasing the potential lifetime of the boss 116. Moreover, the boss 116 can be secured to the liner 120 after the liner 120 is molded. In an exemplary embodiment, structures such as ridges, which can be connected in the form of threads, on peripheral surface 128 are positioned at a far extent of the flange 124, distant from port 126. In an exemplary embodiment, an opening 144 in the liner 120 (labeled in FIG. 9) is smaller than the outer diameter of flange 124 at peripheral surface 128. Thus, the liner 120 is typically flexed to allow passage of the larger boss flange 124, which can be connected to the liner 120 from the interior 17 of the liner 120 (as shown in FIGS. 5-7, for example). This leads to a secure connection, wherein boss 116 and liner 120 are connected not only by cooperating mechanical structures at peripheral surface 128 of boss 116 and opening 144 of liner 120, but also by a liner portion 135 that overlies part of the boss flange 124. It is contemplated that a snap-lock configuration can also be used instead of a threaded engagement.

FIG. 4 is an enlarged view of the joint between boss 116 and liner 120 at interface 162. In the illustrated embodiment, an interference fit is provided between tab 130 of boss 116 and groove 136 of liner 120 on the exterior surface of flange 124. In the illustrated embodiment, liner 120 is formed so that an uncompressed surface of groove 136 would extend to the dotted line 146 in the absence of boss 116. Once boss 116 and liner 120 are assembled together, that portion of groove 136 of liner 120 is compressed by tab 130 of boss 116. This interference fit thereby provides a robust seal between boss 116 and liner 120 at the interface of tab 130 of boss 116 and groove 136 of liner 120.

Figure 8:
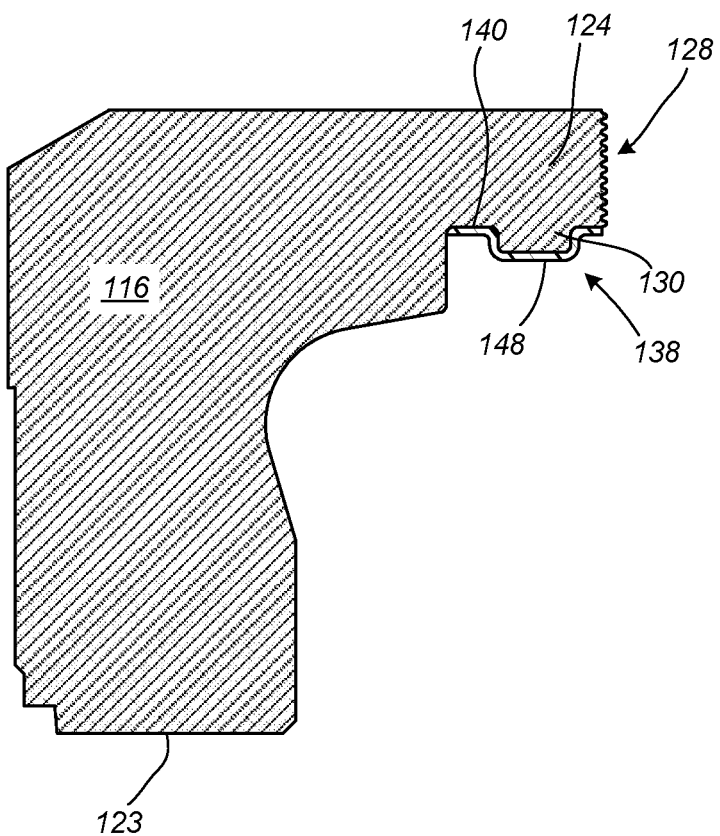
FIG. 8 is a partial cross sectional view of a boss and gasket assembly.

FIG. 8 illustrates another mechanism that can be used in addition or alternatively. In FIG. 8, a sealing element 148 is shown on a surface of flange 124 on exterior side 138 that will be adjacent portion 135 of liner 120. Such a sealing element 148 may be formed as an annular gasket in one embodiment. In another embodiment, sealing element 148 can be provided on flange 124 and/or portion 135 as a coating or layer of caulking material, for example.

An assembly 150 of boss 116 and liner 120, as shown in FIG. 3, can be formed by the methods described above with reference to FIG. 2, wherein a molten liner material is allowed to flow around portions of boss 116, thereby molding to flange 124. In another method of manufacture, liner 120 may be pre-fabricated separately from boss 116. Such pre-fabrication may be accomplished by known means including molding and machining, for example. FIGS. 5-7 illustrate several embodiments of cooperating bosses 116, 116' and liners 120, 120' for forming assembly 150. In an exemplary method, boss 116 is inserted into opening 144 of liner 120 so that boss 116 is attached to liner 120 from an interior 17 of liner 120. In some embodiments, insertion of boss 116 through opening 144 includes flexing of liner 120, especially in a case where opening 144 has a circumferential dimension smaller than a circumferential dimension of flange 124 (e.g., at peripheral surface 128, measured orthogonally from axis 152). As used in this description, the terms "circumferential," "circumference" and the like refer to perimeter references for shapes that may or may not be circles, including polygons, oval, ellipses, and other substantially closed shapes.

In one embodiment, the surfaces of boss 116 and liner 120 at interface 162 are formed with cooperating structural features to allow the boss 116 and liner 120 to be snap-fit together (i.e., wherein cooperating elements flex and return to their respective unflexed configurations to allow mutual passage of complementary structures). In another assembly method, boss 116 including threaded peripheral surface 128 can be used as a tap to create a corresponding cooperating feature in opening 144 of liner 120 as boss 116 is inserted into opening 144. In such a method of assembly, the boss 116 would be rotated about its longitudinal axis 152 (through a center of port 126) as it is inserted into liner 120 in direction 154. The combination of the turning and axial advancement motions causes the threaded peripheral surface 128 to carve out and remove portions of the liner material at perimeter surface 160 of opening 144 of liner 120 to form an interlocked interface 162.

FIG. 5 shows a boss 116 having a threaded peripheral surface 128 that is oriented substantially parallel to longitudinal axis 152. Moreover, perimeter surface 160 of opening 144 of liner 120 is also substantially parallel to longitudinal axis 152. In FIG. 6, components are shown wherein boss 116' has a threaded peripheral surface 128' that is inclined relative to longitudinal axis 152. Liner 120' has an opening 144' having perimeter surface 160' with a complementary inclined orientation. In FIG. 7, the boss 116' of FIG. 6 having an inclined threaded peripheral surface 128' is shown with a liner 120 having an opening 144 with a perimeter surface 160 that is substantially parallel to longitudinal axis 152. Accordingly, in the assembly of boss 116' and liner 120 of FIG. 7, an interference fit is provided at a portion of interface 162 between peripheral surface 128' and perimeter surface 160, for a robust seal there between.

As shown in FIGS. 3 and 4, when boss 116 and liner 120 are attached in assembly 150 to form at least a portion of a pressure vessel, perimeter surface 160 of liner 120 interfaces with peripheral surface 128 of boss 116 at interface 162. Perimeter surface 160 has contours that mate with the contours (e.g., circumferential ridges 158) of peripheral surface 128. Perimeter surface 160 may be manufactured with such contours. In another embodiment, the contours are imparted to perimeter surface 160 as boss 116 and liner 120 are assembled together.

Figure 9:
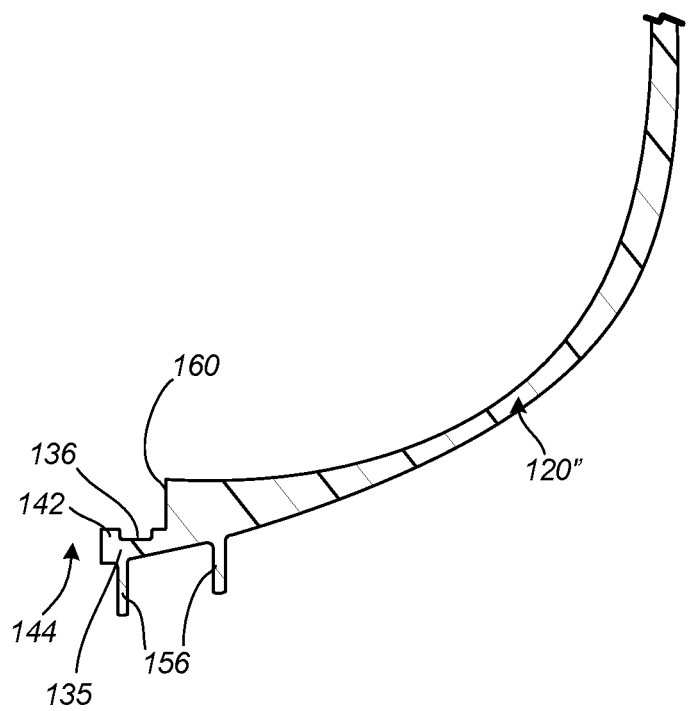
FIG. 9 is a partial cross sectional view of a portion of a liner in an intermediate formation step.

FIG. 9 shows liner 120 in an intermediate formation step, wherein a molded portion of liner 120" includes stand-offs 156, formed by liner material in cavities of the mold. Such cavities are provided so that excess liner material can be received therein. This helps to ensure a high fidelity of surface molding at opening 144, as the use of excess liner material in molding liner 120 helps to eliminate bubbles, voids, and other molding irregularities. After the molding and curing of liner 120", stand-offs 156 can be removed by means including cutting or breaking from the desired form of the completed liner 120.

FIGS. 10A-10E show different embodiments of a ridged peripheral surface 128a-128e for a boss 116a-116e of the present disclosure. While several variations are explicitly illustrated, it is contemplated that other configurations can also be devised.

Figure 10A:
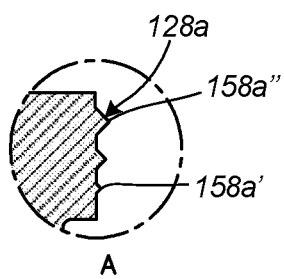
FIGS. 10A-10E show different embodiments for a peripheral surface of a boss of the present disclosure.
Figure 10A:
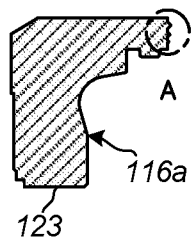

FIG. 10A shows a boss 116a with a threaded peripheral surface 128a having variable pitch diameter threads. For example, first circumferential ridge 158a' is smaller than second circumferential ridge 158a". A thread of this form makes it easier to install the boss 116*a* into an unthreaded plastic liner 120, as shown in FIG. 5. In such a case, threaded peripheral surface 128*a* carves out complementary grooves in liner 120 when boss 116*a* is twisted into opening 144 of liner 120. A lead-in thread 158*a*' is smaller, allowing for easy insertion of boss 116*a* into the liner opening 144, thereby acting as a pilot for a larger thread 158*a*". In this embodiment, a reduced pitch is also provided, as first circumferential ridge 158*a*' and second circumferential ridge 158*a*" are spaced apart, as viewed as a radial cross section. With this reduced or lower pitched thread, few revolutions are needed to seat the boss 116*a* into the opening 144 of liner 120. A resulting benefit is a reduction in assembly time required to form assembly 150.

Figure 10B:
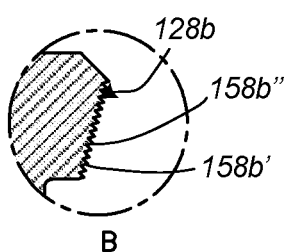
Figure 10B:
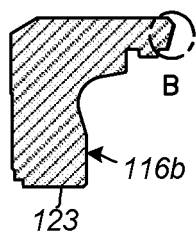

FIG. 10B shows a boss 116*b* with a threaded peripheral surface 128*b* that is inclined, as discussed with reference to FIGS. 6 and 7. With such an inclination of peripheral surface 128*b*, first circumferential ridge 158*b*' is closer to longitudinal axis 152 (shown in FIG. 7) than second circumferential ridge 158*b*". As shown with reference to FIG. 7, this type of thread configuration increases the sealing potential at interface 162 because of an interference between the surface 128*b* and perimeter surface 160 of liner 120.

Figure 10C:
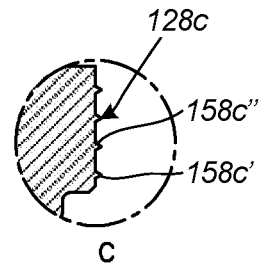
Figure 10C:
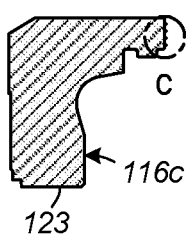

FIG. 10C shows a boss 116*c* with a threaded peripheral surface 128*c* having few, spaced-apart threads or ridges 158. Thus, first circumferential ridge 158*c*' and second circumferential ridge 158*c*" are spaced apart, as viewed as a radial cross section. With this reduced or lower pitched thread, fewer revolutions are needed to seat the boss 116*e* into the opening 144 of liner 120. A resulting benefit is a reduction in assembly time required to form assembly 150.

Figure 10D:
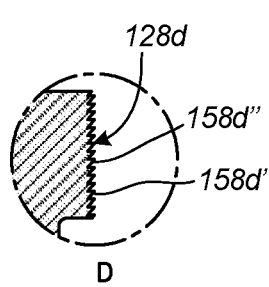
Figure 10D:
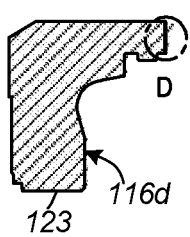

FIG. 10D shows a boss 116*d* having a threaded peripheral surface 128*d* with buttress threads. With a surface of each of the circumferential ridges 158*d* oriented substantially normal to longitudinal axis 152, there is more shear area contact at interface 162 than with a standard configuration of threaded peripheral surface 128 shown in FIG. 4. Accordingly, once assembled into opening 144 of liner 120, this configuration of threads 158*d* resists separation from liner 120 in the direction opposite the insertion direction 154. This design increases the axial load capability in one direction. Thus, the connection between the boss 116*d* and the liner 120 remains robust during the filament winding process for forming a shell 18 and during the service life of the pressure vessel 10.

In the embodiments of FIGS. 10A-10D, each of the circumferential ridges 158*a*-158*d* has a substantially triangular cross-sectional shape having first and second surfaces that meet at an apex. However, other ridge configurations are also possible.

Figure 10E:
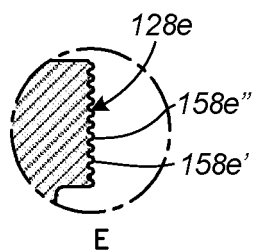
Figure 10E:
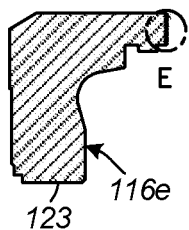

For example, FIG. 10E shows a boss 116*e* having a threaded peripheral surface 128*e* with knuckle threads, in which circumferential ridges 158*e* have convexly curved, rather than sharply angled, edges. This can reduce stress in the interface 162 between the threaded surface 128*e* and in opening 144 in liner 120, which can prevent the plastic material of the liner 120 from forming defects.

Although the subject of this disclosure has been described with reference to several embodiments, workers skilled in the art will recognize that changes may be made in form and detail without departing from the scope of the disclosure. In addition, any feature or description disclosed with respect to one embodiment is applicable to and may be incorporated in another embodiment, and vice-versa.

What is claimed is:

1. A boss including:
   a neck having a longitudinal axis; and
   a flange that extends radially outward from the neck, wherein the flange includes:
      a peripheral surface at a farthest extent from the longitudinal axis,
         wherein the peripheral surface includes a helical screw.

2. The boss of claim 1, wherein the helical screw has a substantially triangular cross-sectional shape having first and second surfaces that meet at an apex.

3. The boss of claim 2, wherein at least one of the first and second surfaces is substantially perpendicular to the longitudinal axis.

4. The boss of claim 1, wherein the helical screw has a convex curve shape.

5. A pressure vessel including a boss and a liner, wherein:
   the boss includes:
      a neck having a longitudinal axis; and
         a flange that extends radially outward from the neck, wherein the flange includes a peripheral surface at a farthest extent from the longitudinal axis;
            wherein the peripheral surface includes a helical screw; and
   the liner includes a perimeter surface that interfaces with the peripheral surface of the boss.

6. The pressure vessel of claim 5, wherein:
   the boss includes an annular tab on an exterior surface of the flange; and
   the liner includes a groove configured to accept the tab.

7. The pressure vessel of claim 6, wherein the tab and the groove are configured so that an interference fit is achieved at an interface of the tab and the groove.

8. The pressure vessel of claim 6, further including a gasket disposed between the tab and the groove.

9. The boss of claim 1 wherein the peripheral surface is parallel to the longitudinal axis.

10. The boss of claim 1 wherein the peripheral surface is inclined relative to the longitudinal axis.

11. The boss of claim 10, wherein the peripheral surface is closer to the longitudinal axis proximate an exterior surface of the flange and wherein the peripheral surface is farther from the longitudinal axis proximate an interior surface of the flange.

* * * * *